United States Patent
Prohofsky (10) Patent No.: US 7,577,742 B1
(45) Date of Patent: Aug. 18, 2009

(54) ACCOUNT CREATION METHOD AND APPARATUS

(75) Inventor: Thomas Roy Prohofsky, Edina, MN (US)

(73) Assignee: Adaptec, Inc., Milpitas, CA (US)

( * ) Notice: Subject to any disclaimer, the term of this patent is extended or adjusted under 35 U.S.C. 154(b) by 893 days.

(21) Appl. No.: 10/777,354

(22) Filed: Feb. 11, 2004

(51) Int. Cl.
  *G06F 15/173* (2006.01)

(52) U.S. Cl. ............... 709/226; 709/220; 709/229; 726/16; 726/27

(58) Field of Classification Search ........... 709/223, 709/226, 225, 229, 220; 726/4, 17, 21, 27–30
See application file for complete search history.

(56) References Cited

U.S. PATENT DOCUMENTS

| | | | | |
|---|---|---|---|---|
| 5,708,780 | A | * | 1/1998 | Levergood et al. ......... 709/229 |
| 5,734,831 | A | * | 3/1998 | Sanders ..................... 709/223 |
| 5,930,801 | A | * | 7/1999 | Falkenhainer et al. ... 707/103 R |
| 6,157,953 | A | * | 12/2000 | Chang et al. ............... 709/225 |
| 6,687,733 | B2 | * | 2/2004 | Manukyan ................. 709/200 |
| 7,003,668 | B2 | * | 2/2006 | Berson et al. .............. 713/182 |
| 7,089,297 | B1 | * | 8/2006 | Salas et al. ................. 709/220 |
| 2002/0095571 | A1 | * | 7/2002 | Bradee ...................... 713/164 |
| 2002/0194326 | A1 | * | 12/2002 | Gold et al. ................. 709/224 |

OTHER PUBLICATIONS http:\\www.apple.com, "Setting up Basic Authentication to an Active Directory Server".
http:\\www.apple.com, "Automounting Share Points".
http:\\www.apple.com, "Mail Services," Technology Brief, Oct. 6, 2003.
http:\\www.apple.com, "Workgroup Manager," Technology Brief, Oct. 6, 2003.
http:\\www.apple.com, "Security," Mac OS X v10.2 Technologies, Feb. 2003.

* cited by examiner

*Primary Examiner*—David Lazaro
(74) *Attorney, Agent, or Firm*—Martine Penilla & Gencarella, LLP (57) ABSTRACT

A method and apparatus for account creation without administrator interaction on a computer network is provided. Specifically, a continuously operating program on a file server creates accounts without the intervention of a system administrator. The continuously operating program on the file server monitors connection points on the file server for requests to create an account. Upon receiving a request from a client computer to create an account, the continuously operating program on the file server processes the request by authenticating a requestor on the client computer and an account identifier transmitted by the requester. After resolving the account identifier, the continuously operating program creates the account in a directory structure and configures software settings for accessing the account. Subsequently, the program notifies the requestor of the newly created account.

18 Claims, 7 Drawing Sheets

ACCOUNT CREATION METHOD AND APPARATUS

BACKGROUND OF THE INVENTION

1. Field of the Invention

The present invention relates to computer system administration, and more specifically to creating accounts on a computer system.

2. Description of the Related Art

Figure 1A:
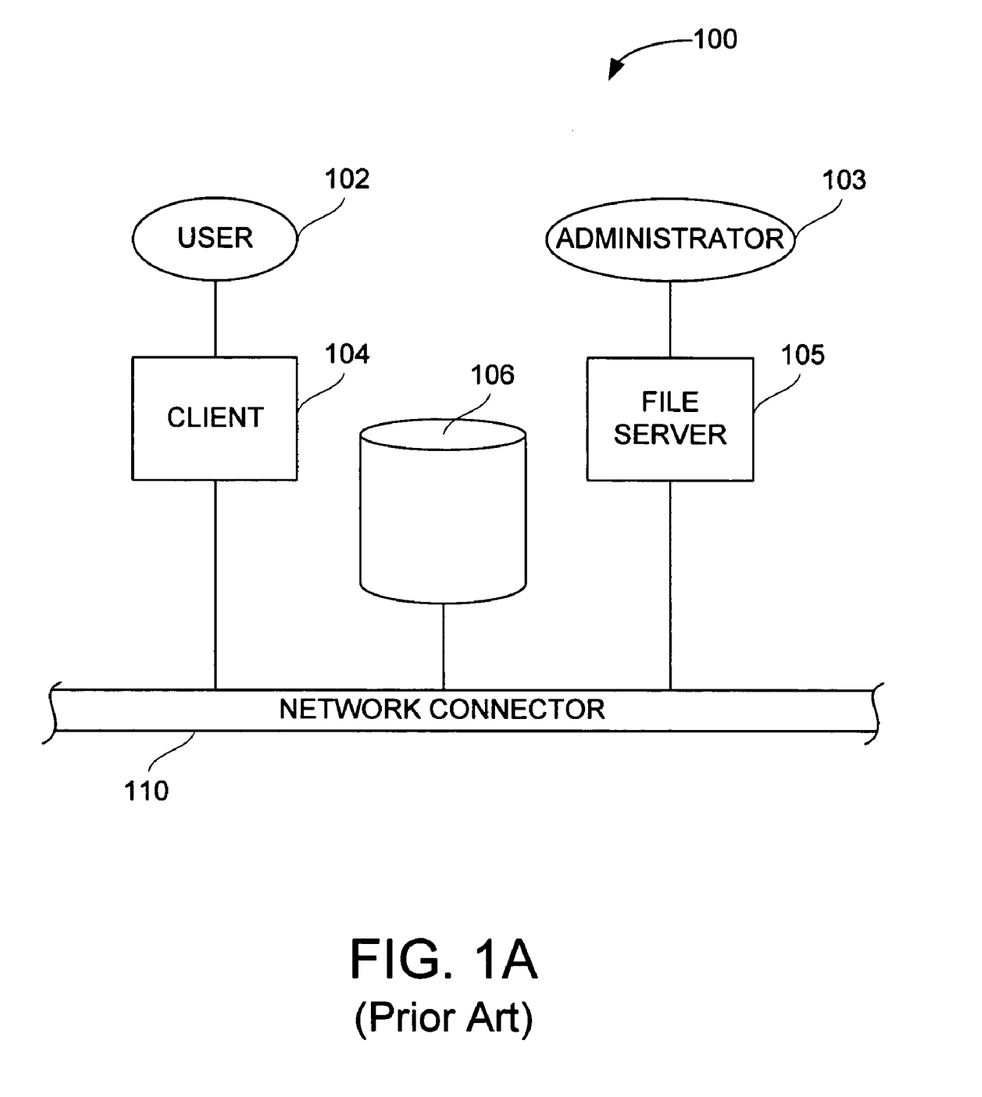
FIG. 1A is a diagram illustrating a computer network.

Typical implementations of computer networks comprise multiple computers and devices connected together via various connection methods. For example, FIG. 1A is a diagram illustrating a computer network 100 with two computers and a storage device 106 connected together via a network connector 110. In the computer network 100, the storage device 106 provides a physical location for data accessible from any point on the computer network 100. The computers can be categorized as a client 104 or a file server 105. The client 104 and the file server 105 can be the same type of computer, but they can also differ. For example, the client 104 can be a computer with limited storage capacity, such as 100 GB, with one processor and 512 MB of random access memory (RAM). In contrast, the file server 105 can be a computer with 20 TB of storage, multiple processors, and 20 GB of RAM. Generally, the file server 105 is capable of storing more data and processing data faster than the client 104.

Data stored on the storage device 106 can be accessed via the network connector 110. Examples of the network connector 110 can include category5 (CAT5) cabling, fiber optic cables, and wireless connection methods such as WiFi® and Bluetooth®. When a user 102 accesses data stored on the storage device 106, the user 102 can log onto a user account previously created on the file server 105. Typically, an administrator 103 creates the user account before the user 102 stores data anywhere on the computer network 100. As the user 102 logs onto the user account using the client 104, the client 104 communicates with the file server 105, authenticating access to the user account. If the file server 105 authenticates the user account, then the user 102 can access data located in the computer network 100. Alternatively, if the file server 105 cannot authenticate the user account, then the user 104 cannot access the data.

Figure 1B:
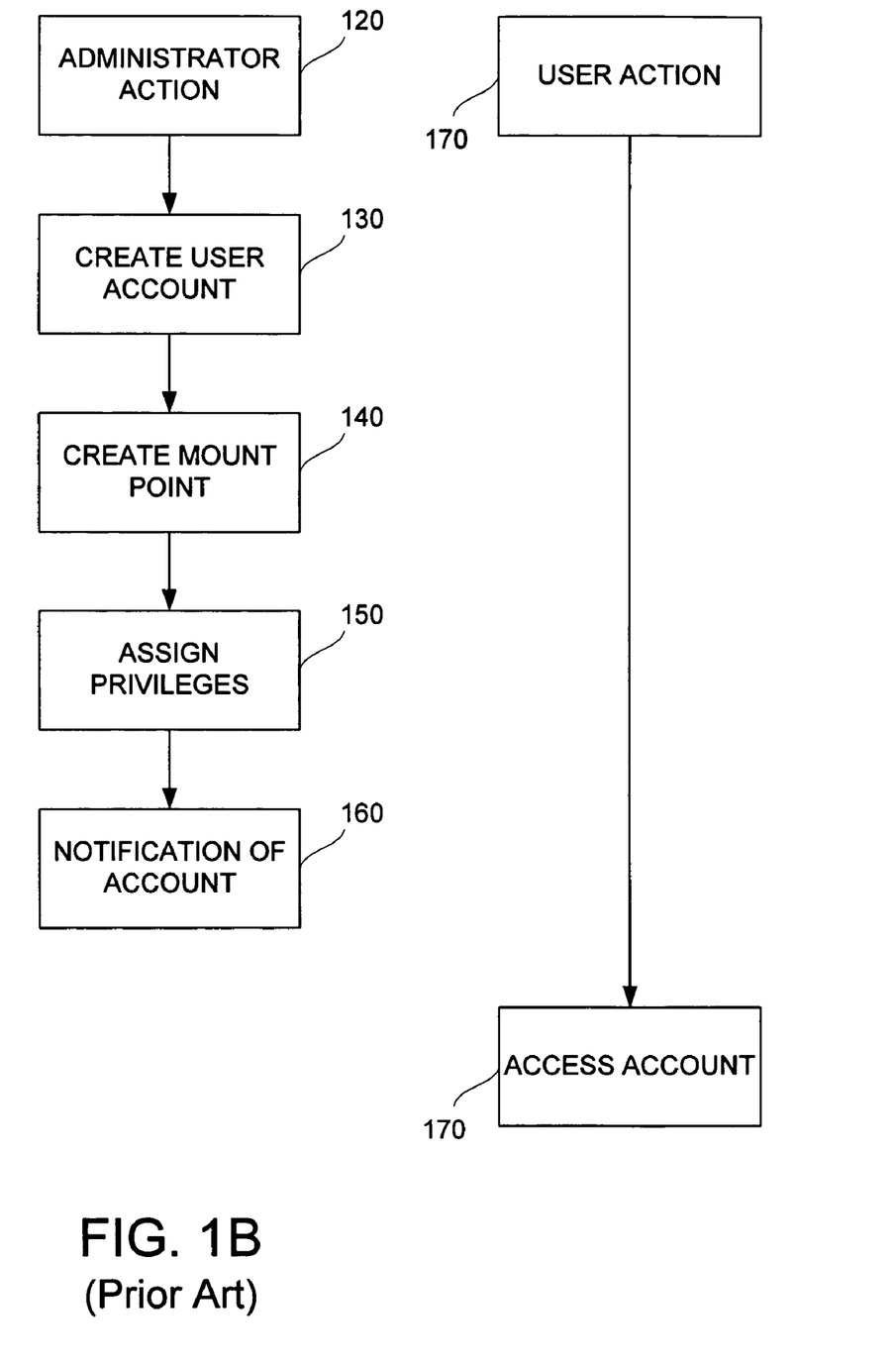
FIG. 1B is a diagram illustrating traditional operations for account creation.

FIG. 1B is a diagram illustrating traditional operations for account creation. For example, the administrator 103 can perform an administrator action in operation 120 while the user can perform a user action 170. In the user action of operation 170, the user 102 can request and wait for the user account. While the user 102 waits, the administrator 103, during operation 120, receives the request and logs onto an administrator account on the file server 105. Subsequently, the administrator 103 creates a user account in operation 130 by entering a username and initial password for the user 102. Then, the administrator 103 creates a mount point location on a directory structure for the user 102 in operation 140. For example, the mount point location can be a directory for the user 102 among other user directories in the storage device 106. The directory can be assigned a set storage limit such as 20 MB of storage. The administrator 103 then performs an operation 150 of assigning privileges to the user account. For example, the user 102 can have permission to read and write data to the 20 MB of storage, but cannot access any amount of storage outside the 20 MB. Finally, in operation 160, the administrator 103 provides notification of the account to the user 102. The user 102 then accesses the account in operation 180.

Using this traditional paradigm of establishing a user account using conventional security protocols, information technology (IT) administration costs have increased. Particularly, in a technical support group of the computer network 100, the administrator 103 must create user accounts. Consequently, while the administrator 103 creates user accounts, the administrator 103 cannot perform other tasks required to maintain the computer network 100. Further, if the computer network 100 increases in complexity, then repeated user account creation operations on multiple file servers 105 can require the additional hire of another administrator 103 to create user accounts. The added staff and the diversion of the administrator 103 from tasks that ensure minimal computer network 100 downtime increases the overall cost of maintaining the computer network 100.

In an attempt to remove administrator interaction, the client 104 can access a guest account on the file server 105. However, guests are given the same privileges as all other guests accessing the guest account on the file server 105. Thus, data is available to all guests using the account. Consequently, because all guests can access the data of all other guests, conventional security protocols that would protect one account from another account do not exist. Without the conventional security protocols, any guest can read, delete, or modify the data of another guest.

Accordingly, what is needed is a method and apparatus to create accounts in a computer network without an administrator action, thus reducing IT administration costs, while maintaining conventional security protocols that provide different privileges between the accounts.

SUMMARY OF THE INVENTION

Broadly speaking, the present invention is a method and apparatus to create an account without administrator intervention. Instead of an administrator, a continuously running program monitors connection points for requests to create an account. Upon receiving a request, the program creates the account without an intervening administrator action. It should be appreciated that the present invention can be implemented in numerous ways, such as a process, an apparatus, a system, a device or a method on a computer readable medium. Several inventive embodiments of the present invention are described below.

In one embodiment, a method is provided for initializing a program on a file server such that the program is capable of creating an account. Additionally, the method includes requesting the account from a requestor such that the requester is capable of bypassing communication to an administrator. Further, the method includes processing a request for the account wherein the program is capable of processing the request and bypassing an intervening administrator action.

In another embodiment, a method for account creation without administrator intervention is provided that initializes a program, such that the program is capable of monitoring a network connection for an account request. The method also includes receiving the account request and authenticating an account identifier for a new account, and processing the account request by creating a location in a structure managed by an operating system for maintaining accounts.

In one embodiment for an apparatus, a system for creating an account without an administrator action provides a requester operating on a client. The client is coupled to a connector, such that the requester is capable of requesting the account. Further, a program is capable of continuous operation on a file server, such that the file server is coupled to the connector, wherein the program is capable of monitoring a connection point for a request to create the account and subsequently creating the account.

Further, in another embodiment of an apparatus, a network provides a first computer coupled to a network connector, the first computer being capable of requesting the creation of an account, and a second computer coupled to the network connector, the second computer being capable of creating the account without administrator intervention.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

The following embodiments describe a method and apparatus for creating accounts on a computer connected to a heterogeneous computer network bypassing an intervening administrator action. In one embodiment, a user can initiate the request to create an account. In another embodiment, a computer program such as a software agent can initiate the request to create the account bypassing administrator intervention. It will be obvious, however, to one skilled in the art, that the present invention may be practiced without some or all of these specific details. In other instances, well known process operations have not been described in detail in order not to unnecessarily obscure the present invention.

Figure 2:
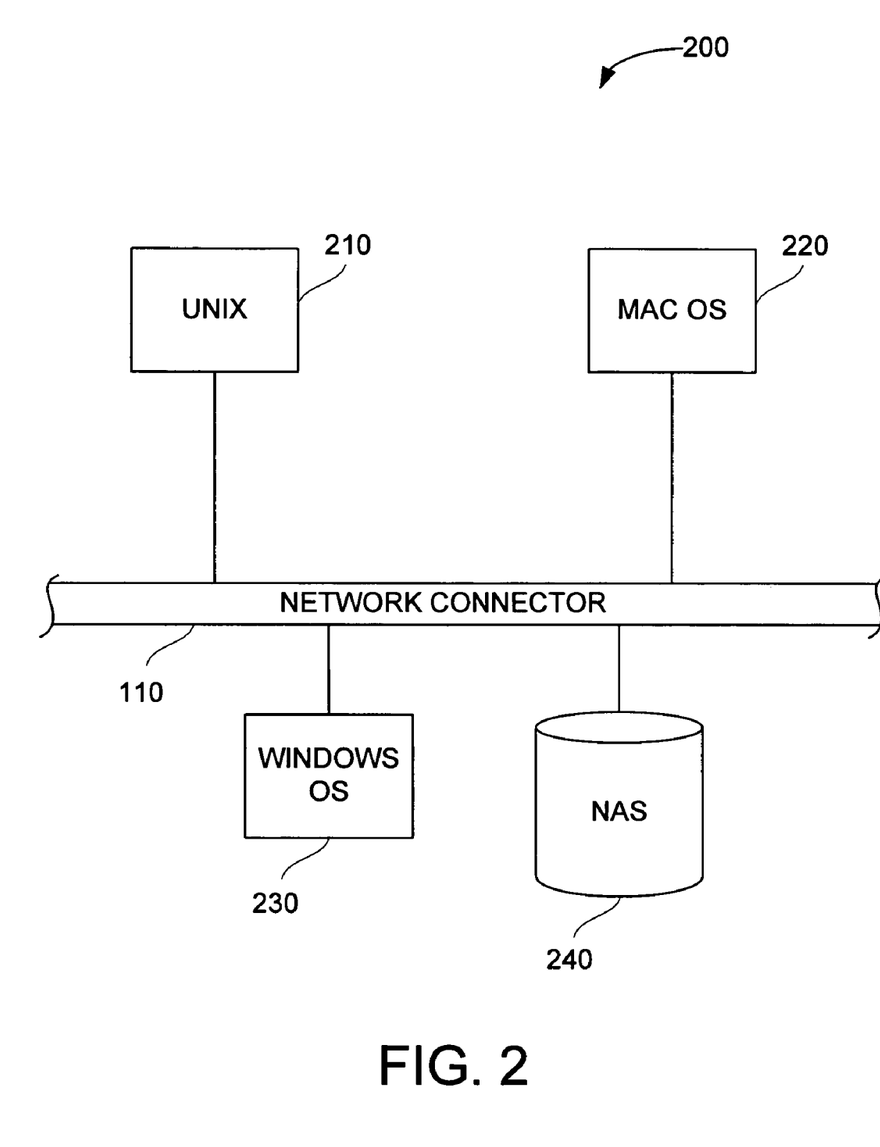
FIG. 2 is a diagram illustrating a network, in accordance with an embodiment of the invention.

FIG. 2 is a diagram illustrating a network-A 200, in accordance with an embodiment of the invention. In one exemplary embodiment, multiple computers with various operating systems (OS) can access data possibly stored on a network attached storage (NAS) device 240 via the network connector 110. The OS is not limited to a particular type, but examples of currently available OS types include a Unix® system 210, a Mac OS system 220, and a Windows® OS system 230. Further, currently available examples of the Unix® system 210 can include a Linux OS, a HP-UX OS, and a Solaris OS. Moreover, currently available examples of the Windows® OS system 230 can include NT, Windows® 2000, and XP. However, any OS is possible, as long as the OS manages the resources and the processes that use the resources of the computer.

To share data, components such as the multiple computers and devices coupled together via the network connector 110, can use a communication protocol to share the data. In one exemplary embodiment, a communication protocol such as Samba or Network File System (NFS) can facilitate data sharing. For example, regarding Samba, if the Unix® system 210 requires particular data such as a file that exists on the Windows® OS system 230, then Samba can facilitate file sharing between the two computers by establishing the message format between the components. However, any communication protocol is possible as long as the communication protocol facilitates data sharing between different components of the network-A 200.

In another embodiment, a hypertext transfer protocol (HTTP) can facilitate data sharing between components of the Internet. For example, a first computer can access data over the Internet by communicating with a second computer geographically distant from the first computer. As long as both computers are coupled to the Internet and can share data via HTTP, accounts can be created on either computer without the intervening administrator action 120.

Figure 3:
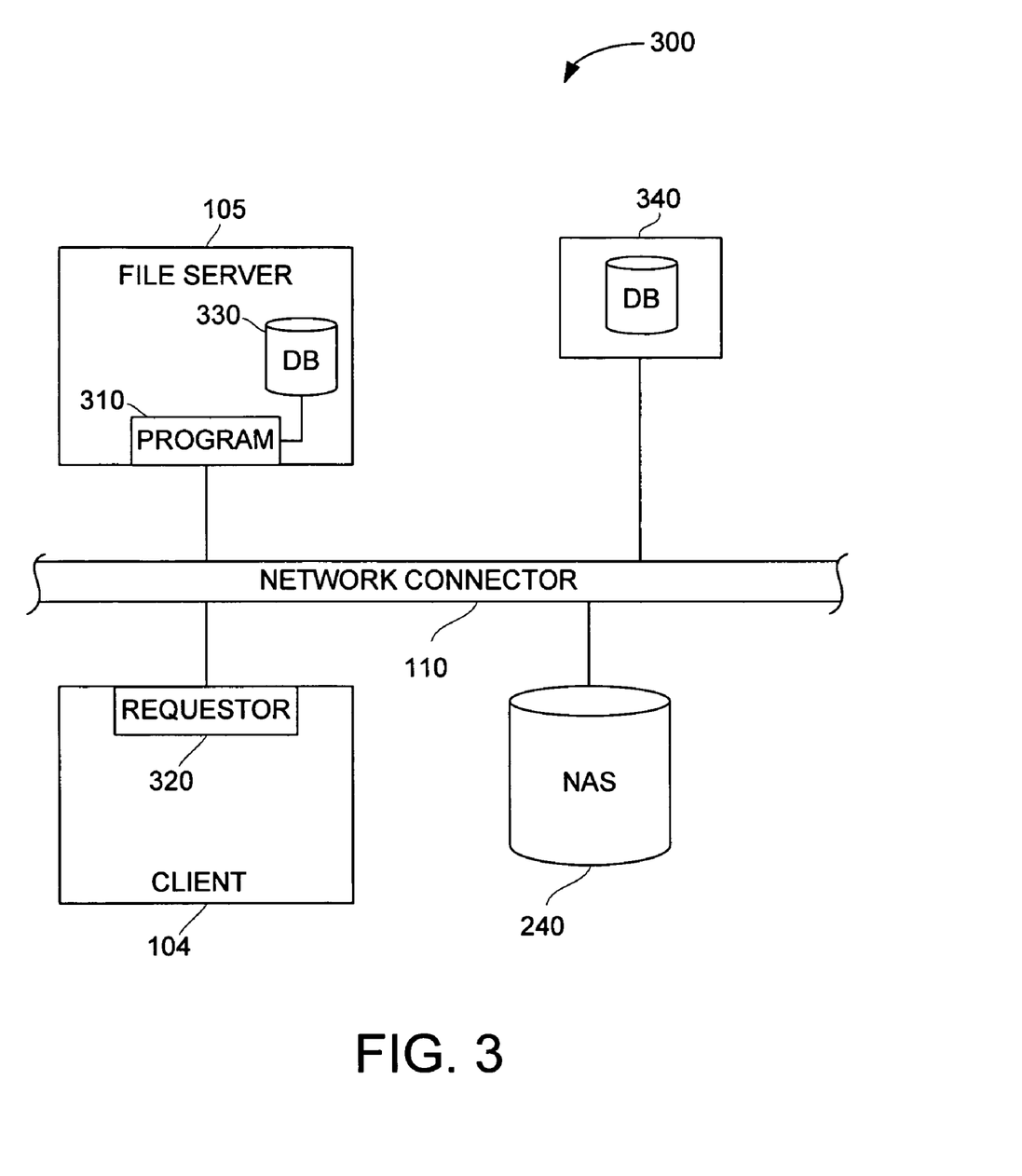
FIG. 3 is a diagram illustrating another network, in accordance with an embodiment of the invention.

FIG. 3 is a diagram illustrating another network-B 300, in accordance with an embodiment of the invention. Components such as the client 104, the file server 105, and a database system 340 are coupled together via the network connector 110. Further, the file server 105 can include a database 330. In one embodiment, the database 330 can provide data for authenticating accounts. However, in another embodiment, the database system 340 can provide data for authenticating accounts. In addition to providing data to authenticate accounts, the database 330 and the database system 340 can reference the directories created for the accounts. For example, directories without a set storage limit can reside on the NAS 240. Subsequently, an account identifier in the database 330 or the database system 340 can reference the directories. However, any method to authenticate accounts is possible, as long as collisions between existing account identifiers and new account identifiers are resolved. Further, although the directory can represent an account that can store data, any method of storing data possible, as long as the client 104 can access the data.

In other exemplary embodiments, the account and the method to reference the account can reside on the same component. Further, if the client 104 or the filer server 105 have sufficient storage and processing capabilities, then account creation, account authentication, and account access without communication to the administrator 103 (FIG. 1) is possible without accessing another component in the network-B 300.

Returning to the embodiment illustrated in FIG. 3, the network-B 300 shows a program 310 coupled to the database 330 operating on the filer server 105. Further, the client 104 can operate a requester 320 that is capable of transmitting the account identifier to the program 310. The program 310 can wait for requests for account creation from the requester 320 and subsequently process the requests. Although the program 310 and the requester 320 can operate on the client 104 and the file server 105, in other embodiments, the program 310 and the requestor 320 can operate separately or in combination on the components shown in FIG. 2.

Figure 4:
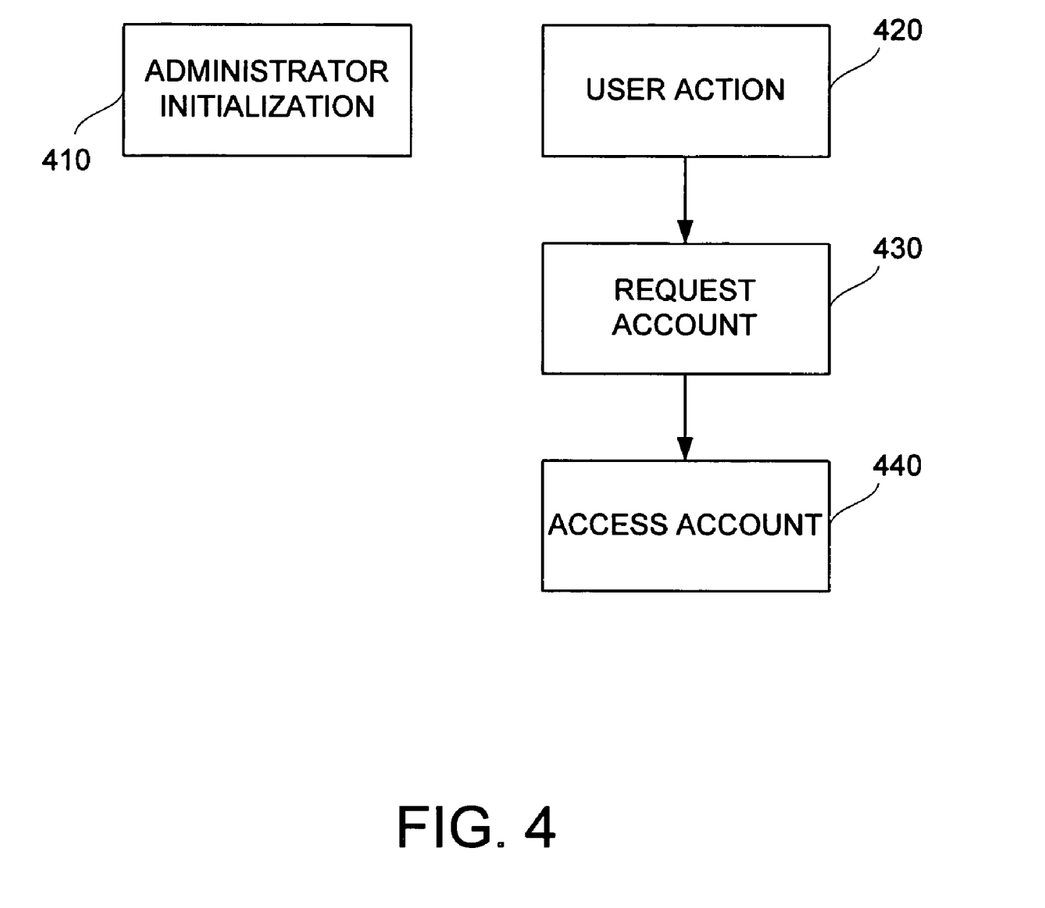
FIG. 4 is a diagram illustrating operations for account creation, in accordance with an embodiment of the invention.

FIG. 4 is a diagram illustrating operations for account creation, in accordance with an embodiment of the invention. In one embodiment, the administrator 103 (FIG. 1A) can perform an administrator initialization in operation 410 such as activating the program 310 on the file server 105 and activating the requestor 320 on the client 104. Thereafter, the administrator 103 performs no other action during account creation. Alternatively, a software agent can perform the actions of the administrator 103, thereby obviating any possible communication to the administrator 103.

Consequently, in operation 420, the user 102 can perform a user action to enter account information, such as the account identifier, in the client 104. Then, by using the requestor 320, the client 104 can request an account in operation 430. The program 310 receives and processes the request, thereby creating the account. Subsequently, the user 104 can access the account in operation 440. Although the user 102 interacts with the components of the network-B 300, in another exemplary embodiment, a software agent can perform the actions of the user 102. Further, in yet another embodiment, any number of requesters 320 can request accounts from the program 310.

In one exemplary embodiment, a computer with Linux using Samba can operate the program 310. The program 310 can operate continuously after initialization until a computer shutdown, an abnormal shutdown, or the program 310 is gracefully shutdown. While in operation, the program 310 can monitor different connection points to the network connector 110 for requests from any requestor 320. Concurrently, another program 310 (not shown) on a non-Linux computer can also monitor the connection points on the non-Linux computer for requests from any requester 320. Accordingly, the program 310 can behave as a background process, such as a daemon, managed by the OS.

After receiving the request, the program 310 authenticates an account identifier transmitted by the requester 320. Thereafter, to create an account, the program 310 can initiate processes for account creation without administrator intervention. In one exemplary embodiment, the processes can include mounting and exporting a directory in a directory structure. In an alternative exemplary embodiment, the processes can include mapping to a share. However, the method used to create the account can be via any method as long as the program 310 can initiate processes that can allocate logical and physical memory address space for an account, without an intervening administrator action.

Figure 5A:
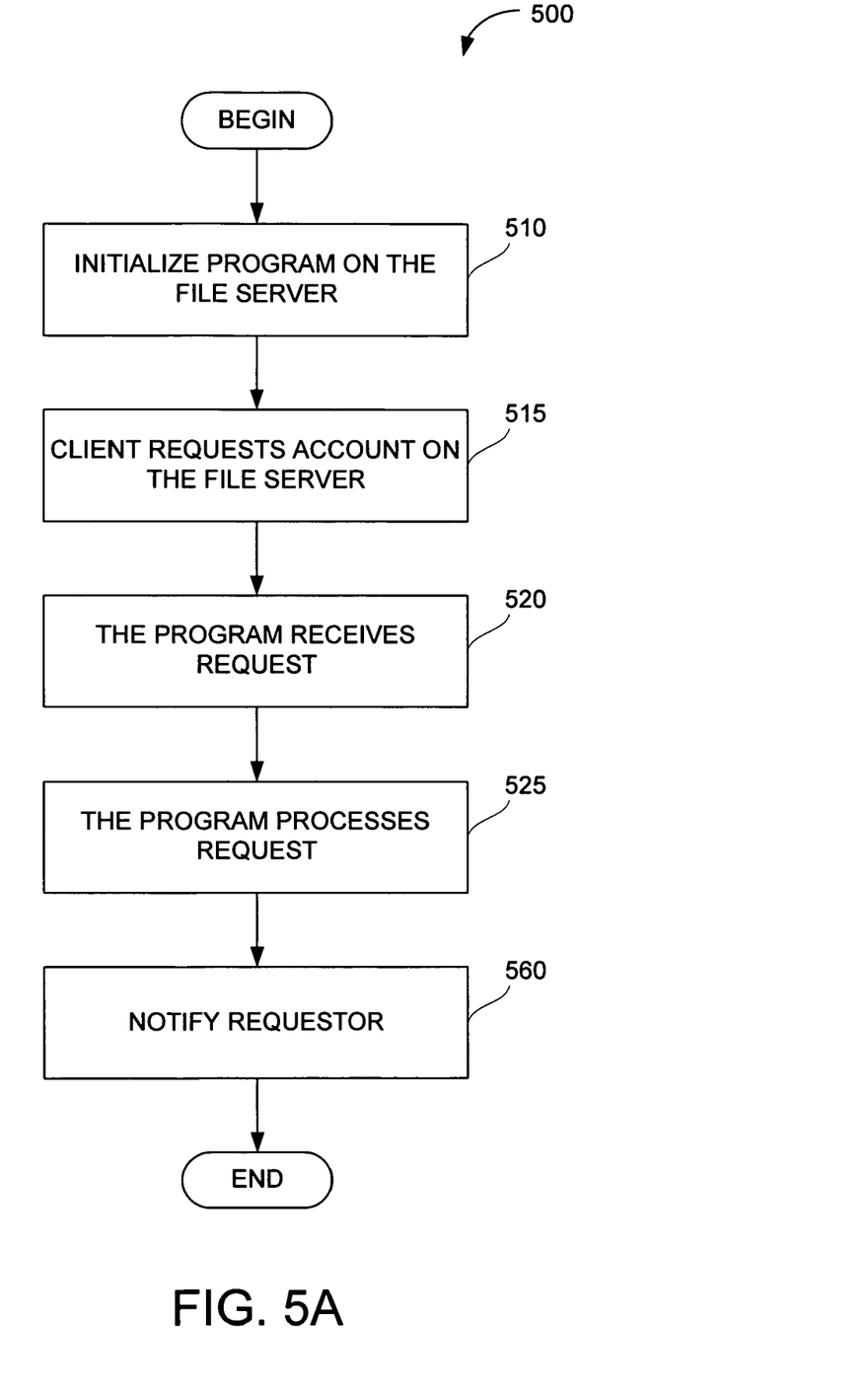
FIG. 5A is a diagram of a method for account creation, in accordance with an embodiment of the invention.

FIG. 5A is a diagram of a method 500 for account creation, in accordance with an embodiment of the invention. Specifically, instead of user 102 and administrator 103 involvement in the account creation process, software agents can perform the same actions as the user 102 and the administrator 103. Accordingly, in operation 510, the method 500 begins when at least one software agent initializes the program 310 on the file server 105. In one embodiment, initializing the program 310 can be the activation of the program 310. Alternatively, the software agent can power up the computer, thereby activating the program 310 and the OS, without requiring administrator privileges. Thereafter, in operation 515, a software agent on the client 104 can request an account on the file server 105 via the requestor 320. In operation 520, the program 310 on the file server 105 receives the request and subsequently, in operation 525, the program 310 processes the request. Consequently, the method 500 ends after operation 560 when the program 310 notifies the requester 320 that the account is available for use.

Figure 5B:
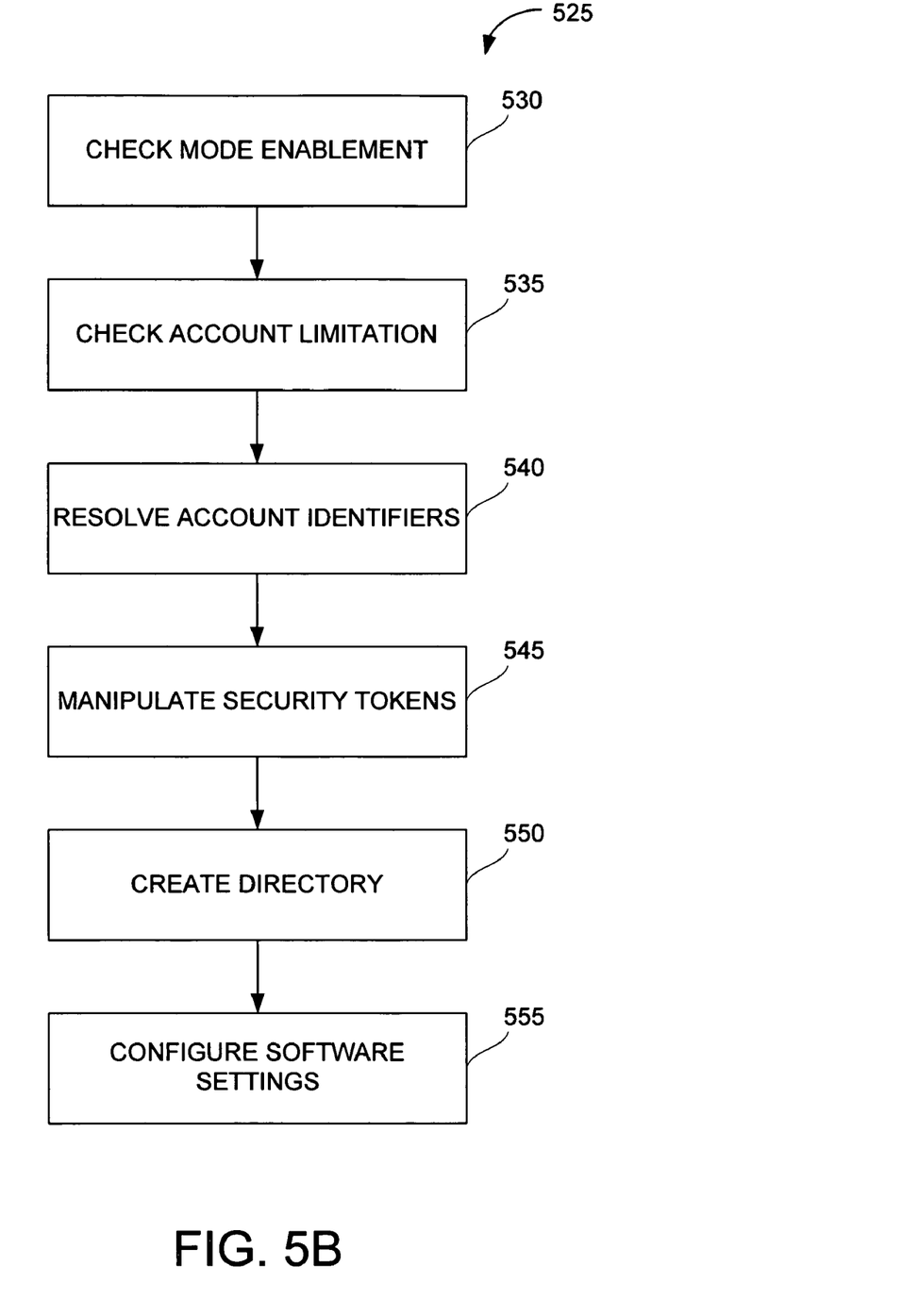
FIG. 5B is a diagram of a method for processing requests, in accordance with an embodiment of the invention.

FIG. 5B is a diagram of a method for processing requests, in accordance with an embodiment of the invention. In operation 525, the program 310 can process requests for account creation from the requestor 320. Specifically, the program 310 can perform the operations of checking for mode enablement, checking for account limitations, resolving account identifiers, manipulating security tokens, creating directories, and configuring software settings. However, other operations are possible, as long as the operations aid in the creation of accounts.

In one exemplary embodiment, as shown in operation 530, the program 310 can check for mode enablement to determine if a particular requestor 320 on a computer has permission to request an account. If the requestor 320 does not have permission, then the program 310 denies the request. Alternatively, if the requestor 320 has permission to request accounts, then the program 310 can check for an account limitation in operation 535. Specifically, checking for an account limitation can include determining the maximum number of accounts on the file server 105 or other component used to store accounts. For example, the database 330 can be configured to store 1000 accounts. When a requestor 320 requests the creation of the 1001 account, the program 310 can deny the request. The number of accounts is purely exemplary and can be any number. Further, in other embodiments, there may be no account limitation, thereby obviating operation 535.

In operation 540, the program 310 resolves account identifiers. Specifically, if the program 310 determines that an existing account identifier in the database 330 exists, then the program 310 can inform the requester 320 to choose another account identifier. Thereafter, in operation 545, the program 310 manipulates security tokens to encrypt the account identifier and account password. In operation 550, the program 310 creates a new directory by allocating locations in a directory tree structure and associates the account identifier and account password with the new directory. In one embodiment, the existing directory tree structure managed by the OS can provide a connection point for the new directory. However, the directory can be created in any structure managed by the OS for maintaining accounts. Subsequently, in operation 555, the program 310 configures software settings related to the proper operation of the newly created account.

In alternative embodiments, the software agent can also request that an account be deleted. Specifically, the software agent can request the deletion of an account, leaving the data unmodified, or the software agent can request the deletion of the account and the data associated with the account. Further, in other embodiments, the program 310 can permit the requester 320 to request modifications to the account such as granting and removing privileges to others to access the account. Thus, administrator 103 interaction is further reduced.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
    initializing a program on a file server through administrator action to activate the program, the program being configured to create an account without further administrator action;
    requesting the account from a requester on a client, the requester being activated through administrator action and configured to bypass communication to an administrator; and
    processing a request for the account wherein the program is configured to process the request and bypass an intervening administrator action;
    wherein processing the request further includes,
    checking for mode enablement to determine if the requester has permission to request the account, and
    checking for an account limitation to determine if a maximum number of accounts created has been reached.

2. A method of claim 1, wherein initializing the program includes activating the program, the program being capable of operating continuously.

3. A method of claim 1, wherein requesting the account includes transmitting an account identifier to the program.

4. A method of claim 1, wherein processing the request includes executing operations when the program receives an account identifier.

5. A method of claim 4, wherein processing the request further includes resolving the account identifier and manipulating security tokens to encrypt the account identifier and an account password.

6. A method of claim 4, wherein processing the request further includes creating a directory and configuring software settings.

7. A method of claim 6, wherein creating a directory includes allocating locations on a directory tree structure.

8. A method for account creation without administrator intervention, comprising:
    initializing a program through administrator action to activate the program, the program being configured to monitor a network connection for an account request and configured to create an account without further administrator action;
    receiving the account request from a software agent, the software agent being activated through administrator action and configured to bypass communication to an administrator, and authenticating an account identifier for a new account; and
    processing the account request by creating a location in a structure managed by an operating system for maintaining accounts, wherein the program is configured to process the request and bypass an intervening administrator action;
    wherein processing the account request further includes,
    checking for mode enablement to determine if a requestor of the account has permission to request the account, and
    checking for an account limitation to determine if a maximum number of accounts created has been reached.

9. A system for creating an account without an administrator action, comprising:
    a requestor operating on a client, the client being coupled to a connector, the requestor being activated through administrator action and configured to bypass communication to an administrator, wherein the requester is configured to request the account;
    a network attached storage (NAS) device coupled to the connector, the NAS device being configured to store the account; and
    a program capable of continuous operation on a file server, the program being activated through administrator action, the file server being coupled to the connector, wherein the program is configured to monitor a connection point for a request to create the account and subsequently creating the account without further administrator action;
    wherein creating the account further includes,
    checking for mode enablement to determine if the requestor has permission to request the account, and
    checking for an account limitation to determine if a maximum number of accounts created has been reached.

10. A system for creating an account without an administrator action of claim 9, further comprising a database for authenticating an account identifier.

11. A system for creating an account without an administrator action of claim 10, wherein the program is coupled to the database.

12. A system for creating an account without an administrator action of claim 10, further comprising a directory in a directory tree structure.

13. A system for creating an account without an administrator action of claim 12, wherein the program initiates at least one process to create the directory.

14. A network, comprising:
    a first computer coupled to a network connector, the first computer being configured to request the creation of an account through a requestor activated through administrator action and configured to bypass communication to an administrator;
    a second computer coupled to the network connector;
    a network attached storage (NAS) device coupled to the network connector, the NAS device being configured to store the account; and
    a program residing in the second computer, the program being activated through administrator action, wherein the program processes a request to create an account and creates the account without further administrator action, wherein creating the account further includes,
    checking for mode enablement to determine if a requestor in the first computer has permission to request the account, and
    checking for an account limitation to determine if a maximum number of accounts created has been reached.

15. A network of claim 14, further comprising a database coupled to the network connector, the database capable of providing data to authenticate an account identifier.

16. A network of claim 14, wherein the network connector is capable of facilitating file sharing.

17. A network of claim 14, further comprising a directory in a directory structure.

18. A network of claim 17, wherein the directory structure is a tree structure.

* * * * *